Patented July 12, 1938

2,123,370

UNITED STATES PATENT OFFICE 2,123,370

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application September 30, 1937, Serial No. 166,586

19 Claims. (Cl. 260—112)

This invention relates to an improved process for the manufacture of ammonium dithiocarbamate.

The objects of the invention are the manufacture of ammonium dithiocarbamate of high purity, in yields which approach the theoretical, at an economical cost. These objects have not been previously attainable by the methods described in the literature.

Previous workers used alcohol as a diluting medium or diluent for the interaction of carbon disulfide and ammonia to form ammonium dithiocarbamate. Poor yields of rather impure ammonium dithiocarbamate were obtained.

According to the present invention, carbon disulfide is dissolved in a ketone, which serves as a diluent, and ammonia is passed in. Ammonium dithiocarbamate is formed as a crystalline compound and precipitates almost immediately.

Ketones which may be used as diluents according to this invention include, among others, alkyl ketones. Best results are obtained using alkyl ketones of the general formula

where R is an alkyl group and R' is an alkyl group containing more than two carbon atoms. These include methyl propyl ketone, methyl butyl ketone, methyl isobutyl ketone, dipropyl ketone, methyl hexyl ketone. Alkyl ketones of the general formula

where both R and R' are alkyl groups containing less than three carbon atoms are less useful in the process, presumably due to the tendency for other reactions to take place during the addition of ammonia to form ammonium dithiocarbamate. These include acetone, methyl ethyl ketone, diethyl ketone.

Olefinic ketones, as mesityl oxide and phorone, are useful as diluents. Alkyl-aryl ketones and alkyl-aralkyl ketones, such as acetophenone and methyl benzyl ketone, are likewise satisfactory in the process.

It is to be understood that the term "ketone" is employed herein in its usual sense to refer to compounds containing the carbonyl group CO united to two hydrocarbon groups, and not to refer to compounds containing other substituents.

The reaction conditions according to this invention do not require the use of pure ketones. If desired, varying amounts of organic diluents, such as hydrocarbons, may be added to the ketone. Most satisfactory results are obtained when the reaction medium consists essentially of ketone.

The reaction is preferably carried out in a reactor provided with some cooling device, such as a jacket for circulating brine. Approximately one molecular proportion of carbon disulfide is dissolved in the diluting ketone. Approximately two molecular proportions of gaseous ammonia are passed in, with agitation.

The temperature for carrying out the reaction may be varied. A range of 15° to 35° C. is convenient for operating purposes and gives satisfactory results. Lower temperatures may also be employed. The reaction can also be carried out at a pressure greater than atmospheric in which case loss of ammonia is prevented.

After a short period of ammonia addition, ammonium dithiocarbamate crystallizes out, being only sparingly soluble in the diluting ketones commonly employed. When the required amount of ammonia has been added, agitation is preferably continued for a short time, and the ammonium dithiocarbamate is then filtered off. The product may be air dried to remove ketone. If higher boiling ketones are employed, a wash with an inert, volatile solvent is desirable.

A modification in this procedure may be adopted when a water solution of ammonium dithiocarbamate is desired. In this case a ketone of sufficiently high molecular weight to have a low water solubility, such as mesityl oxide, methyl butyl ketone, and the like, should be used. Water is added to the suspension of ammonium dithiocarbamate in the diluting ketone, the product is readily dissolved, and the water solution separated from the ketone. An advantage of this alternative method is the fact that a water solution of ammonium dithiocarbamate is more stable than the dry powder.

In either method, some purification of the diluting ketone before further use in the process is necessary to maintain the high purity of the ammonium dithiocarbamate.

Distillation is a desirable means of purification. Loss of ketone during purification represents only a small fraction of a pound per pound of ammonium dithiocarbamate produced.

The following examples describe the process more specifically, but it will be understood that the invention is not limited to these details. Wide variations both in the process and amounts of reactants are possible without materially affecting the results.

Example 1

167 g. of carbon disulfide are dissolved in 750 cc. of methyl isobutyl ketone in a reaction flask. Over a period of about two hours, 68 g. of ammonia are passed in, with agitation. After a few minutes of ammonia addition, light yellow crystals of ammonium dithiocarbamate start to precipitate. The temperature is maintained at 20–30° C. during the course of the reaction.

After all the ammonia has been added, the thick reaction mixture is allowed to agitate about fifteen minutes, then filtered and dried. The dry weight is 212 g., representing a 96.5% yield.

Example 2

The process, essentially as described in Example 1, is repeated using 107 g. of $CS_2$, 45 g. of ammonia and 500 cc. of mesityl oxide. The dry weight of ammonium dithiocarbamate is 134 g., representing a 91.3% yield.

The process is repeated using the water extraction modification. Instead of filtering after the addition of ammonia, 200 cc. of water are added to the suspension of ammonium dithiocarbamate in mesityl oxide. The ammonium dithiocarbamate is readily dissolved and its water solution is separated from the mesityl oxide layer. The weight increase of the water layer is 138 g., representing a 94% yield. Mesityl oxide is practically insoluble in the concentrated solution of ammonium dithiocarbamate and may be readily separated therefrom.

Example 3

The process, essentially as described in Example 1, is repeated using 19 g. of carbon disulfide, 8.5 g. of ammonia and 125 cc. of acetophenone. The ammonium dithiocarbamate, after filtering, is washed with hexane and dried. The dry weight is 24.8, representing a 90% yield.

The process may be carried out as explained in the examples, using any one of the selection of ketones previously described. The invention is not limited to the use of ketones specifically named or necessarily to ketones of the general groups listed.

From the data herein presented the fact will be readily apparent that this invention constitutes a distinct improvement over previous processes for preparing ammonium dithiocarbamate. Yields have been increased to over 90%. The quality of ammonium dithiocarbamate has been greatly improved making purification unnecessary before use of the compound for synthetic work. By this improvement in quality a distinctly more stable compound is obtained. Conditions for its preparation according to this invention do not require close control. A wide temperature range may be used; the amounts of reactants may be varied greatly from those theoretically required, without affecting adversely either the yield or quality of ammonium dithiocarbamate produced. Other organic diluents may be added to the ketone. By reason of the high yield of the product, and the ease of purification and small loss of diluting ketone, ammonium dithiocarbamate may be inexpensively prepared by the process described.

I claim:

1. A process for the manufacture of ammonium dithiocarbamate which comprises interacting carbon disulfide and ammonia in the presence of a ketone.

2. A process for the manufacture of ammonium dithiocarbamate which comprises passing gaseous ammonia into carbon disulfide diluted with a liquid, volatile ketone.

3. A process for the manufacture of ammonium dithiocarbamate which comprises reacting substantially one molecular proportion of carbon disulfide with substantially two molecular proportions of ammonia in a diluting medium consisting of a ketone.

4. A process according to claim 3 where the ammonium dithiocarbamate formed is water extracted from its suspension in a ketone of low water solubility.

5. A process for the manufacture of ammonium dithiocarbamate which comprises reacting carbon disulfide and ammonia in the presence of a member of the group consisting of olefinic ketones, alkyl aryl ketones and alkyl ketones of the general formula

where R is an alkyl group and R' is an alkyl group containing more than 2 carbon atoms.

6. A process according to claim 5 where substantially one molecular proportion of carbon disulfide is caused to react with substantially two molecular proportions of ammonia.

7. A process according to claim 5 where the ammonium dithiocarbamate formed is water extracted from the suspension in a ketone of low water solubility.

8. A process for the manufacture of ammonium dithiocarbamate which comprises reacting carbon disulfide and ammonia in a diluting medium consisting of an alkyl ketone of the general formula

where R is an alkyl group and R' is an alkyl group containing more than 2 carbon atoms.

9. A process according to claim 8 where the ammonium dithiocarbamate formed is water extracted from the suspension in a ketone of low water solubility.

10. A process for the manufacture of ammonium dithiocarbamate which comprises reacting carbon disulfide and ammonia in a diluting medium consisting of an alkyl aryl ketone.

11. A process for the manufacture of ammonium dithiocarbamate which comprises reacting carbon disulfide and ammonia in a diluting medium consisting of an alkyl aryl ketone of low water solubility, and water-extracting the product.

12. A process for the manufacture of ammonium dithiocarbamate which comprises reacting carbon disulfide and ammonia in a diluting medium consisting of an olefinic ketone.

13. A process for the manufacture of ammonium dithiocarbamate which comprises reacting carbon disulfide and ammonia in a diluting medium consisting of an olefinic ketone of low water solubility, and water-extracting the product.

14. A process for the manufacture of ammonium dithiocarbamate which comprises reacting carbon disulfide and ammonia in a diluting medium consisting of methyl isobutyl ketone.

15. A process for the manufacture of ammonium dithiocarbamate which comprises reacting carbon disulfide and ammonia in a diluting medium consisting of methyl isobutyl ketone, and water-extracting the product.

16. A process for the manufacture of ammonium dithiocarbamate which comprises reacting carbon disulfide and ammonia in a diluting medium consisting of acetophenone.

17. A process for the manufacture of ammonium dithiocarbamate which comprises reacting carbon disulfide and ammonia in a diluting medium consisting of acetophenone, and water-extracting the product.

18. A process for the manufacture of ammonium dithiocarbamate which comprises reacting carbon disulfide and ammonia in a diluting medium consisting of mesityl oxide.

19. A process for the manufacture of ammonium dithiocarbamate which comprises reacting carbon disulfide and ammonia in a diluting medium consisting of mesityl oxide, and water-extracting the product.

ROGER A. MATHES.